United States Patent
Chen et al.

(10) Patent No.: US 10,673,504 B2
(45) Date of Patent: Jun. 2, 2020

(54) TRANSMISSION PARAMETER DETERMINATION METHOD AND APPARATUS

(71) Applicant: ZTE Corporation, Shenzhen (CN)

(72) Inventors: Zewei Chen, Shenzhen (CN); Jun Xu, Shenzhen (CN); Bo Dai, Shenzhen (CN); Jin Xu, Shenzhen (CN); Zhaohua Lu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/561,291

(22) PCT Filed: Mar. 3, 2016

(86) PCT No.: PCT/CN2016/075546
§ 371 (c)(1),
(2) Date: Sep. 25, 2017

(87) PCT Pub. No.: WO2016/155458
PCT Pub. Date: Oct. 6, 2016

(65) Prior Publication Data
US 2018/0131428 A1    May 10, 2018

(30) Foreign Application Priority Data

Mar. 27, 2015    (CN) .......................... 2015 1 0137895

(51) Int. Cl.
*H04B 7/06*    (2006.01)
*H04L 1/00*    (2006.01)
(Continued)

(52) U.S. Cl.
CPC ............. *H04B 7/0626* (2013.01); *H04L 1/00* (2013.01); *H04L 1/08* (2013.01); *H04L 1/1864* (2013.01);
(Continued)

(58) Field of Classification Search
CPC ....... H04B 7/0626; H04L 1/1812; H04L 1/00; H04L 1/18; H04L 1/0009; H04L 1/0003; H04L 5/0023; H04W 24/10; H04W 72/08
See application file for complete search history.

(56) References Cited

U.S. PATENT DOCUMENTS

2006/0111100 A1    5/2006  Murata
2014/0187283 A1*   7/2014  Nimbalker .......... H04W 72/048
                                                    455/550.1
(Continued)

FOREIGN PATENT DOCUMENTS

CN    101370164 A    2/2009
CN    102447546 A    5/2012
(Continued)

OTHER PUBLICATIONS

International Search Report for corresponding application PCT/CN2016/075546 filed on Mar. 3, 2016; dated May 30, 2016.

*Primary Examiner* — Thai Nguyen
(74) *Attorney, Agent, or Firm* — Cantor Colburn LLP

(57) ABSTRACT

A transmission parameter determination method and apparatus are provided. In the method, a second node determines a transmission parameter grade X1 based on a predetermined set and at least one of predetermined information and indication signaling.

16 Claims, 1 Drawing Sheet

A second node determines a transmission parameter grade X1 based on a predetermined set and at least one of predetermined information and indication signaling — S102

(51) Int. Cl.
    *H04L 5/00*          (2006.01)
    *H04L 1/08*          (2006.01)
    *H04L 1/18*          (2006.01)
    *H04W 24/10*        (2009.01)
    *H04W 72/08*        (2009.01)

(52) U.S. Cl.
    CPC .......... *H04L 1/1893* (2013.01); *H04L 5/0007* (2013.01); *H04L 5/0053* (2013.01); *H04L 5/0091* (2013.01); *H04W 24/10* (2013.01); *H04L 1/0003* (2013.01); *H04L 1/0009* (2013.01); *H04L 1/1812* (2013.01); *H04L 5/0023* (2013.01); *H04W 72/08* (2013.01)

(56) References Cited

U.S. PATENT DOCUMENTS

2015/0117196 A1\* 4/2015 Wang .................... H04L 1/0018
                                                                                              370/232
2016/0150484 A1\* 5/2016 Seo ..................... H04W 52/242
                                                                                              455/522

FOREIGN PATENT DOCUMENTS

CN          103490864 A     1/2014
WO        2015005601 A1    1/2015

\* cited by examiner

A second node determines a transmission parameter grade X1 based on a predetermined set and at least one of predetermined information and indication signaling — S102

Fig. 1

Determination module 22

Transmission parameter determination apparatus

Fig. 2

TRANSMISSION PARAMETER DETERMINATION METHOD AND APPARATUS

TECHNICAL FIELD

The disclosure relates to the field of communications, and more particularly to a transmission parameter determination method and apparatus.

BACKGROUND

In a mobile communication system, a basic principle of adaptive coding and modulation is to select an appropriate modulation and coding scheme based on change in a wireless channel. A receiving end may perform channel measurement to obtain Channel State Information (CSI) and feed the CSI back to a sending end. The sending end may perform scheduling based on system resources and the CSI fed back by the receiving end, select a most appropriate downlink modulation and coding scheme, and optimize a system throughput.

In some application scenarios, the CSI feedback in a related technology may be limited. For example, at a Long Term Evolution (LTE) Release-13 stage, in order to save transmitting power and to provide coverage for enhanced Machine Type Communication (MTC), a User Equipment (UE) may not support measurement and feedback of periodic CSI, so that the sending end cannot obtain the CSI. In fact, a new CSI feedback solution may be taken into consideration to assist the sending end in adaptive coding and modulation.

At an LTE Release-12 stage, Device to Device (D2D) may support broadcast communication only, and the receiving end may not perform CSI feedback. Unicast D2D may improve the system performance, and introduction of CSI feedback may improve gains of the unicast D2D. A soft Hybrid Automatic Repeat Request (HARQ) may serve as a potential CSI feedback solution for the unicast D2D.

The essence of the soft HARQ is an implementation manner of CSI feedback. In the HARQ of a related technology, when a data packet is correctly received, the receiving end may respond with Acknowledgment (ACK), and otherwise, the receiving end may respond with Negative Acknowledgment (NACK). When this technique is adopted, the sending end cannot obtain more link information from the responses. In the soft HARQ, by increasing a small amount of feedback bits, other information may also be attached when the receiving end sends the ACK/NACK, and the attached information may be used to indicate various link information, such as posterior CSI, a difference between a current Signal to Interference and Noise Ratio (SINR) and a target SINR, an error pattern of a received code block, an error bit rate, a coding rate, a modulation scheme, and time-frequency resources occupied by data. The attached information may assist the sending end in adaptive adjustment of a transmission parameter, so that HARQ transmission may be better implemented. To sum up, the soft HARQ can implement link adaption under limited signaling overhead and implementation complexity. Meanwhile, compared with the traditional CSI feedback, the soft HARQ can perform CSI feedback more quickly and more immediately.

In a soft HARQ technology, the feedback bits may indicate other link information (such as transmission parameter) in addition to ACK/NACK. However, there is no specific solution for determining the link information. Therefore, a new technology may be needed to determine the link information. The link information assists the sending end in better HARQ transmission. Under the situation of a non-soft HARQ, if the link information is determined in an appointment manner, the sending end and the receiving end may acquire the link information simultaneously without signaling interaction, and in this case, the receiving end may not perform link information feedback.

Any effective solution has not been proposed yet for a problem in a related technology regarding how to determine a transmission parameter.

SUMMARY

Some embodiments of the disclosure provide a transmission parameter determination method and apparatus, which may at least solve a problem in a related technology regarding how to determine a transmission parameter.

According to one embodiment of the disclosure, a transmission parameter determination method is provided. The method may include the following act. A second node may determine a transmission parameter grade X1 based on a predetermined set and at least one of predetermined information and indication signaling. The transmission parameter grade X1 may be used for indicating a grade of a transmission parameter for HARQ transmission. The transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: Radio Resource Control (RRC) signaling and Downlink Control Information (DCI).

In the embodiment of the disclosure, a set form of the predetermined set may include at least one of the following set forms: set form 1: the predetermined set may consist of exponential sequences; set form 2: the predetermined set may consist of arithmetic sequences; set form 3: the predetermined set may consist of geometric sequences; set form 4: the predetermined set may consist of irregular sequences; set form 5: the predetermined set may be formed by combining elements of a sequence S1 and a sequence S2, the sequence S1 and the sequence S2 being one or more of a geometric sequence, an arithmetic sequence, an exponential sequence and an irregular sequence respectively; set form 6: the predetermined set may include a subset, the subset may consist of one or more of a geometric sequence, an arithmetic sequence, an exponential sequence and an irregular sequence, other elements may be included between elements contained in the subset and/or at two sides of one or more elements contained in the subset, one or more elements contained in the subset and one or more adjacent elements form at least one local sequence, and the at least one local sequence may be one or more of a geometric sequence, an arithmetic sequence, an exponential sequence and an irregular sequence.

In the embodiment of the disclosure, the act that the second node determines the transmission parameter grade X1 based on the predetermined set and at least one of the predetermined information and the indication signaling may include the following acts. The second node may select one or more transmission parameter grades X from the predetermined set based on at least one of the predetermined information and the indication signaling. The second node may determine the transmission parameter grade X1 from the one or more transmission parameter grades X. In this embodiment, the one or more transmission parameter grades X form a subset of the predetermined set.

In the embodiment of the disclosure, the second node may determine the transmission parameter grade X1 from the one or more transmission parameter grades X based on at least one of: a difference value between a current SINR and a target SINR, a specified target Block Error Ratio (BLER) working point, a target average transmission count needed for correctly receiving a transmission block under a current channel condition, and an HARQ transmission count.

In the embodiment of the disclosure, the act that the second node determines the transmission parameter grade X1 from the one or more transmission parameter grades X may include one of the following acts. The transmission parameter grade X1 which enables a difference value between the target SINR and a receiving SINR during correct receiving of a transmission block to be minimum may be selected from the one or more transmission parameter grades X. The transmission parameter grade X1 which enables a receiving SINR during correct receiving of a transmission block to be a minimum SINR larger than the target SINR may be selected from the one or more transmission parameter grades X.

In the embodiment of the disclosure, the act that the second node selects one or more transmission parameter grades X from the predetermined set based on at least one of the predetermined information and the indication signaling may include the following acts. A specified grade group may be selected from a specified grade group set based on a determined transmission parameter grade a, and the one or more transmission parameter grades X may be determined based on the specified grade group. The transmission parameter grade a may be determined by means of at least one of the following manners:

determination manner 1: the transmission parameter grade a may be determined through at least one of RRC signaling and DCI;

determination manner 2: the transmission parameter grade a may be determined based on a transmission parameter for initial transmission or previous HARQ transmission of a corresponding transmission block, or the transmission parameter grade a may be determined based on transmission parameters for all transmissions, which have been executed, of a corresponding transmission block;

determination manner 3: the transmission parameter grade a may be determined based on all corresponding transmission parameters of a transmission block which has been correctly received or based on a transmission parameter for initial HARQ transmission;

determination manner 4: the transmission parameter grade a may be determined based on a transmission parameter grade fed back by the second node; and determination manner 5: the transmission parameter grade a may be pre-defined.

The specified grade group set may be obtained by means of one of the following manners:

determination manner A: the predetermined set may be divided into multiple specified grade groups, forming the specified grade group set, based on one of the following manners: grouping manner 1: every N1 successive adjacent elements in the predetermined set may form one specified grade group, N1 being a positive integer; grouping manner 2: N2 elements extracted from the predetermined set at equal intervals may form one specified grade group, N2 being a positive integer; and grouping manner 3: M1 adjacent elements extracted from the predetermined set and M2 elements extracted from the predetermined set at intervals may form one specified grade group, both M1 and M2 being positive integers; and determination manner B: the specified grade group set may be obtained based on indication signaling configurations or based on pre-defined configurations.

In the embodiment of the disclosure, the elements of the specified grade group may directly indicate transmission parameters corresponding to transmission parameter grades, or the one or more transmission parameter grades X may be obtained by performing specified operation on the transmission parameters corresponding to the elements of the specified grade group and a transmission parameter corresponding to the transmission parameter grade a.

In the embodiment of the disclosure, the grouping manner 1 or the grouping manner 2 or the grouping manner 3 may be determined based on at least one of: the RRC signaling, indication of the DCI, the transmission block size, the code rate, and the HARQ transmission count.

In the embodiment of the disclosure, the act of determining the grouping manner 2 may include the following acts. When the code rate is larger than a first predetermined threshold value, the grouping manner 2 may be selected. When the HARQ transmission count is larger than a second predetermined threshold value, the grouping manner 2 may be selected.

In the embodiment of the disclosure, the specified grade group may be selected from the specified grade group set based on the determined transmission parameter grade a by means of at least one of the following selection manners:

selection manner 1: selecting a grade group, having the following features, from the specified grade group set as the specified grade group: the transmission parameter corresponding to the transmission parameter grade a is smaller than or equal to transmission parameters corresponding to transmission parameter grades in the grade group;

selection manner 2: selecting a grade group, having the following features, from the specified grade group set as the specified grade group: the transmission parameter corresponding to the transmission parameter grade a is larger than or equal to transmission parameters corresponding to transmission parameter grades in the grade group; and selection manner 3: selecting a grade group, having the following features, from the specified grade group set as the specified grade group: the transmission parameter corresponding to the transmission parameter grade a is smaller than transmission parameters corresponding to a part of transmission parameter grades in the grade group and larger than transmission parameters corresponding to remaining part or parts of transmission parameter grades in the grade group.

In the embodiment of the disclosure, the selection manner 1 or the selection manner 2 or the selection manner 3 may be determined based on at least one of: the transmission parameter grade a, the preset trigger condition, the RRC signaling, indication of the DCI, the transmission block size, the code rate, and the HARQ transmission count.

In the embodiment of the disclosure, the act of determining the selection manner 1 or the selection manner 2 or the selection manner 3 may include the following acts. When the transmission parameter corresponding to the transmission parameter grade a belongs to transmission parameters corresponding to N3 minimum elements in the predetermined set or when the transmission parameter grade a is smaller than A1, the selection manner 1 may be selected.

When the transmission parameter corresponding to the transmission parameter grade a belongs to transmission parameters corresponding to N4 maximum elements in the predetermined set or when the transmission parameter grade a is smaller than A2, the selection manner 2 may be selected. Under other situations, the selection manner 3 may be selected. In this embodiment, N3 and N4 may be positive integers, and A1 and A2 may be real numbers.

In the embodiment of the disclosure, when the preset trigger condition includes a specified service requirement, the selection manner 1 or the selection manner 2 or the selection manner 3 may be selected through one of the following manners. If the transmission parameter corresponding to the transmission parameter grade a is larger than transmission parameters corresponding to N5 minimum elements in the predetermined set and smaller than transmission parameters corresponding to N6 maximum elements in the predetermined set or when the transmission parameter grade a is larger than A3 and smaller than A4, the manner may include at least one of:

selecting the selection manner 3 based on a pre-defined manner;

when the specified service requirement is a requirement for high spectrum efficiency and saving of time-frequency resources, selecting the selection manner 2 or the selection manner 3;

when the specified service requirement is a requirement for low delay, selecting the selection manner 1 or the selection manner 3; and when the specified service requirement is a requirement for compromised spectrum efficiency and delay, selecting the selection manner 3, where N5 and N6 may be positive integers, and A3 and A4 may be real numbers.

In the embodiment of the disclosure, the act of determining the selection manner 1 or the selection manner 2 or the selection manner 3 may include one of the following acts. When the transmission block size is larger than a third predetermined threshold value, the selection manner 2 may be selected. When the transmission block size is smaller than a fourth predetermined threshold value, the selection manner 1 may be selected. When the code rate is larger than a fifth predetermined threshold value, the selection manner 1 may be selected. When the HARQ transmission count is larger than a sixth predetermined threshold value, the selection manner 1 may be selected.

In the embodiment of the disclosure, the second node may be an MTC device or a base station or a D2D device.

According to another embodiment of the disclosure, a transmission parameter determination apparatus is also provided. The apparatus may be applied to a second node, and may include a determination module. The determination module may be configured to determine a transmission parameter grade X1 based on a predetermined set and at least one of predetermined information and indication signaling. The transmission parameter grade X1 may be used for indicating a grade of a transmission parameter for HARQ transmission. The transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: RRC signaling and DCI.

In the embodiment of the disclosure, the determination module may be further configured to: select one or more transmission parameter grades X from the predetermined set based on at least one of the predetermined information and the indication signaling; and determine the transmission parameter grade X1 from the one or more transmission parameter grades X. In this embodiment, the one or more transmission parameter grades X may form a subset of the predetermined set.

In the embodiment of the disclosure, the second node may be an MTC device or a base station or a D2D device.

By means of the solution of some embodiments of the disclosure, a second node may determine a transmission parameter grade X1 based on a predetermined set and at least one of predetermined information and indication signaling. The transmission parameter grade X1 may be used for indicating a grade of a transmission parameter for HARQ transmission. The transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: RRC signaling and DCI. A problem in a related technology regarding how to determine a transmission parameter may be solved, thus implementing determination of the transmission parameter.

BRIEF DESCRIPTION OF THE DRAWINGS

FIG. 1 is a flowchart of a transmission parameter determination method according to an embodiment of the disclosure; and FIG. 2 is a block diagram of a transmission parameter determination apparatus according to an embodiment of the disclosure.

DETAILED DESCRIPTION OF THE EMBODIMENTS

In the present embodiment, a transmission parameter determination method is provided. FIG. 1 is a flowchart of a transmission parameter determination method according to an embodiment of the disclosure. As shown in FIG. 1, the flow may include the act S102 as follows.

At act S102, a second node may determine a transmission parameter grade X1 based on a predetermined set and at least one of predetermined information and indication signaling. The transmission parameter grade X1 may be used for indicating a grade of a transmission parameter for HARQ transmission. The transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: RRC signaling and DCI.

By means of the above-mentioned act, the transmission parameter grade X1 may be determined based on the predetermined set and at least one of the predetermined information and the indication signaling. Compared with a related technology where there is no specific solution for determining link information, the above-mentioned act may solve a problem in a related technology regarding how to determine a transmission parameter, and may implement determination of the transmission parameter.

In the embodiment of the disclosure, a set form of the predetermined set includes at least one of the following set forms:

set form 1: the predetermined set may consist of exponential sequences;

set form 2: the predetermined set may consist of arithmetic sequences;

set form 3: the predetermined set may consist of geometric sequences;

set form 4: the predetermined set may consist of irregular sequences;

set form 5: the predetermined set may be formed by combining elements of a sequence S1 and a sequence S2, the sequence S1 and the sequence S2 being one or more of a geometric sequence, an arithmetic sequence, an exponential sequence and an irregular sequence respectively;

set form 6: the predetermined set may include a subset, the subset may consist of one or more of a geometric sequence, an arithmetic sequence, an exponential sequence and an irregular sequence, other elements may be included between elements contained in the subset and/or at two sides of one or more elements contained in the subset, one or more elements contained in the subset and one or more adjacent elements may form at least one local sequence, and the at least one local sequence may be one or more of a geometric sequence, an arithmetic sequence, an exponential sequence and an irregular sequence.

Act S102 may be may be implemented in the following manner. The second node may select one or more transmission parameter grades X from the predetermined set based on at least one of the predetermined information and the indication signaling. The second node may determine the transmission parameter grade X1 from the one or more transmission parameter grades X. In this embodiment, the one or more transmission parameter grades X may form a subset of the predetermined set.

The second node may select the transmission parameter grade X1 from the one or more transmission parameter grades X based on multiple references. In an exemplary embodiment, the references may include: a difference value between a current SINR and a target SINR, a specified target BLER working point, a target average transmission count needed for correctly receiving a transmission block under a current channel condition, and an HARQ transmission count.

In an alternative embodiment, the act that the second node determines the transmission parameter grade X1 from the one or more transmission parameter grades X may include one of the following acts. The transmission parameter grade X1 which enables a difference value between the target SINR and a receiving SINR during correct receiving of a transmission block to be minimum may be selected from the one or more transmission parameter grades X. Alternatively, the transmission parameter grade X1 which enables a receiving SINR during correct receiving of a transmission block to be a minimum SINR larger than the target SINR may be selected from the one or more transmission parameter grades X.

In an exemplary embodiment, the act that the second node selects one or more transmission parameter grades X from the predetermined set based on at least one of the predetermined information and the indication signaling may include the following acts. A specified grade group may be selected from a specified grade group set based on a determined transmission parameter grade a, and the one or more transmission parameter grades X may be determined based on the specified grade group. The transmission parameter grade a may be determined by means of at least one of the following manners:

determination manner 1: the transmission parameter grade a may be determined through at least one of RRC signaling and DCI;

determination manner 2: the transmission parameter grade a may be determined based on a transmission parameter for initial transmission or previous HARQ transmission of a corresponding transmission block, or the transmission parameter grade a may be determined based on transmission parameters for all transmissions, which have been executed, of a corresponding transmission block;

determination manner 3: the transmission parameter grade a may be determined based on all corresponding transmission parameters of a transmission block which has been correctly received or based on a transmission parameter for initial HARQ transmission;

determination manner 4: the transmission parameter grade a may be determined based on a transmission parameter grade fed back by the second node; and determination manner 5: the transmission parameter grade a may be pre-defined.

The specified grade group set may be obtained by means of one of the following manners:

determination manner A: the predetermined set may be divided into multiple specified grade groups, forming the specified grade group set, based on one of the following manners: grouping manner 1: every N1 successive adjacent elements in the predetermined set may form one specified grade group, N1 being a positive integer; grouping manner 2: N2 elements extracted from the predetermined set at equal intervals may form one specified grade group, N2 being a positive integer; and grouping manner 3: M1 adjacent elements extracted from the predetermined set and M2 elements extracted from the predetermined set at intervals may form one specified grade group, both M1 and M2 being positive integers; and determination manner B: the specified grade group set may be obtained based on indication signaling configurations or based on pre-defined configurations.

In an exemplary embodiment, elements of the specified grade group may directly indicate transmission parameters corresponding to transmission parameter grades. In an alternative exemplary embodiment, the transmission parameter grade X may be obtained by performing specified operation on the transmission parameters corresponding to the elements of the specified grade group and a transmission parameter corresponding to the transmission parameter grade a.

There may be multiple forms of obtaining the specified grade group set through the determination manner B. In an exemplary embodiment, the forms may include:

grade group form 1: transmission parameters corresponding to grades in the specified grade group set may be larger than or equal to a transmission parameter corresponding to the transmission parameter grade a;

grade group form 2: transmission parameters corresponding to grades in the specified grade group set may be equal to a transmission parameter corresponding to the transmission parameter grade a; and grade group form 3: the specified grade group may simultaneously include transmission parameter grades larger than or equal to a transmission parameter corresponding to the transmission parameter grade a. Thus, the specified grade group set may be obtained based on the determination manner B.

The grouping manner 1 or the grouping manner 2 or the grouping manner 3 may be selected through multiple manners. In an exemplary embodiment, the manner may be determined based on at least one of: the RRC signaling, indication of the DCI, the transmission block size, the code rate, and the HARQ transmission count.

In an exemplary embodiment, the act of determining the grouping manner 2 may include the following acts. When the code rate is larger than a first predetermined threshold value, the grouping manner 2 may be selected. When the HARQ transmission count is larger than a second predetermined threshold value, the grouping manner 2 may be selected.

In an exemplary embodiment, the specified grade group may be selected from the specified grade group set based on the determined transmission parameter grade a by means of at least one of the following selection manners:

selection manner 1: selecting a grade group, having the following features, from the specified grade group set as the specified grade group: the transmission parameter corresponding to the transmission parameter grade a is smaller than or equal to transmission parameters corresponding to transmission parameter grades in the grade group;

selection manner 2: selecting a grade group, having the following features, from the specified grade group set as the specified grade group: the transmission parameter corresponding to the transmission parameter grade a is larger than or equal to transmission parameters corresponding to transmission parameter grades in the grade group; and selection manner 3: selecting a grade group, having the following features, from the specified grade group set as the specified grade group: the transmission parameter corresponding to the transmission parameter grade a is smaller than transmission parameters corresponding to a part of transmission parameter grades in the grade group and larger than transmission parameters corresponding to remaining part or parts of transmission parameter grades in the grade group.

The selection manner 1 or the selection manner 2 or the selection manner 3 may be determined based on multiple types of information. In an exemplary embodiment, the information may include at least one of: the transmission parameter grade a, the preset trigger condition, the RRC signaling, indication of the DCI, the transmission block size, the code rate, and the HARQ transmission count.

In an exemplary embodiment, the act of determining the selection manner 1 or the selection manner 2 or the selection manner 3 may include the following acts. When the transmission parameter corresponding to the transmission parameter grade a belongs to transmission parameters corresponding to N3 minimum elements in the predetermined set or when the transmission parameter grade a is smaller than A1, the selection manner 1 may be selected. When the transmission parameter corresponding to the transmission parameter grade a belongs to transmission parameters corresponding to N4 maximum elements in the predetermined set or when the transmission parameter grade a is smaller than A2, the selection manner 2 may be selected. Under other situations, the selection manner 3 may be selected. In the exemplary embodiment, N3 and N4 may be positive integers, and A1 and A2 may be real numbers.

In an exemplary embodiment, when the preset trigger condition includes a specified service requirement, the selection manner 1 or the selection manner 2 or the selection manner 3 may be selected through one of the following manners. If the transmission parameter corresponding to the transmission parameter grade a is larger than transmission parameters corresponding to N5 minimum elements in the predetermined set and smaller than transmission parameters corresponding to N6 maximum elements in the predetermined set or when the transmission parameter grade a is larger than A3 and smaller than A4, the manner may include at least one of:

selecting the selection manner 3 based on a pre-defined manner;

selecting the selection manner 2 or the selection manner 3 when the specified service requirement is a requirement for high spectrum efficiency and saving of time-frequency resources;

selecting the selection manner 1 or the selection manner 3 when the specified service requirement is a requirement for low delay; and selecting the selection manner 3 when the specified service requirement is a requirement for compromised spectrum efficiency and delay, where N5 and N6 may be positive integers, and A3 and A4 may be real numbers.

There may be multiple selection manners of the selection manner 1 or the selection manner 2 or the selection manner 3. In an exemplary embodiment, when the transmission block size is larger than a third predetermined threshold value, the selection manner 2 may be selected; or, when the transmission block size is smaller than a fourth predetermined threshold value, the selection manner 1 may be selected; or, when the code rate is larger than a fifth predetermined threshold value, the selection manner 1 may be selected; or, when the HARQ transmission count is larger than a sixth predetermined threshold value, the selection manner 1 may be selected. By virtue of the above selection manners, the specific selection manner to be used among the selection manner 1, the selection manner 2 and the selection manner 3 may be determined.

In an exemplary embodiment, the second node may be an MTC device or a base station or a D2D device. In an exemplary embodiment, a second node may feed the determined transmission parameter grade X1 back to a first node. In an exemplary embodiment, the second node may be an MTC device, and the first node may be a base station; or the second node and the first node may both be D2D devices. In another exemplary embodiment, the second node may be a base station, and the first node may be an MTC device; or the second node and the first node may both be D2D devices.

In the present embodiment, a transmission parameter determination apparatus is also provided. The apparatus may be used to implement the above-mentioned embodiment and preferable implementation manner. Those which have been illustrated will not be elaborated herein. Just as a term 'module' used below, the combination of software and/or hardware with predetermined functions may be implemented. Although the apparatus described by the following embodiment may be better implemented by software, the implementation of hardware or the combination of software and hardware may be possible and conceived.

FIG. 2 is a block diagram of a transmission parameter determination apparatus based on an embodiment of the disclosure. The apparatus may be applied to a second node. As shown in FIG. 2, the apparatus may include a determination module 22. The determination module 22 may be configured to determine a transmission parameter grade X1 based on a predetermined set and at least one of predetermined information and indication signaling. The transmission parameter grade X1 may be used for indicating a grade of a transmission parameter for HARQ transmission. The transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: RRC signaling and DCI.

In the embodiment of the disclosure, a set form of the predetermined set may include at least one of the following set forms:

set form 1: the predetermined set may consist of exponential sequences;

set form 2: the predetermined set may consist of arithmetic sequences;

set form 3: the predetermined set may consist of geometric sequences;

set form 4: the predetermined set may consist of irregular sequences;

set form 5: the predetermined set may be formed by combining elements of a sequence S1 and a sequence S2, the sequence S1 and the sequence S2 being one or more of a geometric sequence, an arithmetic sequence, an exponential sequence and an irregular sequence respectively;

set form 6: the predetermined set may include a subset, the subset may consist of one or more of a geometric sequence, an arithmetic sequence, an exponential sequence and an irregular sequence, other elements may be included between elements contained in the subset and/or at two sides of one or more elements contained in the subset, one or more elements contained in the subset and one or more adjacent elements may form at least one local sequence, and the at least one local sequence may be one or more of a geometric sequence, an arithmetic sequence, an exponential sequence and an irregular sequence.

In the embodiment of the disclosure, the determination module 22 may be further configured to: select one or more transmission parameter grades X from the predetermined set based on at least one of the predetermined information and the indication signaling; and determine the transmission parameter grade X1 from the one or more transmission parameter grades X, wherein the one or more transmission parameter grades X may form a subset of the predetermined set.

In the embodiment of the disclosure, the second node may be an MTC device, and a first node may be a base station; or the second node and the first node may both be D2D devices.

In the embodiment of the disclosure, the second node may be a base station, and the first node may be an MTC device; or the second node and the first node may both be D2D devices.

The above-mentioned problem existing in a related technology will be illustrated hereinbelow with reference to specific exemplary embodiments. The above-mentioned exemplary embodiments and exemplary implementation manners thereof are combined in the following exemplary embodiments.

Embodiment 1

The present embodiment elaborates multiple implementation manners of the predetermined set A in the claims. The embodiment includes the following sub-embodiments. In the present embodiment and other embodiments of the present disclosure, a first node may be a base station, and a second node may be a terminal. Alternatively, the second node may be a base station, and the first node may be a terminal. In the present embodiment and other embodiments of the present disclosure, a scenario that the transmission parameter grade refers to a retransmission count grade and is used to indicate a transmission repeat count is taken as an example. Alternatively, the transmission parameter may be a code rate, time-frequency resources occupied by data transmission, a modulation scheme, a transmission block size or the like, respectively used to indicate a coding rate of data, time-frequency resources occupied by data, a modulation scheme of data, a transmission block size or the like. In fact, the first node may acquire current communication link information (transmission parameter) based on one of the repeat count, the code rate, the time-frequency resources occupied by data transmission, the modulation scheme and the transmission block size fed back by the second node, together with second node relevant parameters known to the current first node. That is to say, the repeat count, the code rate, the time-frequency resources occupied by data transmission, the modulation scheme and the transmission block size are equivalent in utility, but are slightly different in feedback form.

In other embodiments of the disclosure, the base station may transmit one transmission block or a redundant version of the transmission block for S1 times in S1 successive subframes for one-time HARQ transmission, and then may stop sending and wait for feedback from the terminal. If the terminal feeds back correct reception acknowledgement information, the transmission of the transmission block is completed. Otherwise, if the base station receives incorrect reception acknowledgment information and attached repeat grade information, the base station may continuously transmit the transmission block or the redundant version of the transmission block for S2 times in S2 successive subframes for the next HARQ transmission. This operation may be repeated in such way until data is correctly received. S1 and S2 here refer to repeat counts for one-time HARQ transmission. It may be important to note that the repeat counts for one-time HARQ transmission may not always be equal to the repeat counts fed back by the terminal. The repeat count fed back by the terminal plays a role in assisting the base station in determination of an actual retransmission count.

Sub-Embodiment 1.1

The predetermined set A may consist of exponential sequences. In the present sub-embodiment, for example, $A=\{2^3, 2^4, \ldots, 2^8\}$, where ^ is a power notation. For example, $2^3$ represents the third power of 2. Three adjacent elements in the predetermined set A may be grouped. For example, $\{2^3, 2^4, 2^5\}$, $\{2^4, 2^5, 2^6\}$, $\{2^6, 2^7, 2^8\}$, ... each may be taken as a group respectively. The first node may configure, for example, a retransmission count grade $a=2^5$ through RRC signaling. The second node may select a grade group X (equivalent to the one or more transmission parameter grades X in FIG. 1 in the above-mentioned embodiment), so that the retransmission count grade a (equivalent to the transmission parameter grade a in the above-mentioned embodiment) belongs to the grade group X, and is smaller than a part of retransmission count grades in the grade group X and larger than remaining part or parts of retransmission count grades in the grade group. Then in this sub-embodiment, for example, X={2^4,2^5,2^6}. The second node may select a retransmission count grade X1 (equivalent to the transmission parameter grade X1 in the above-mentioned embodiment) from the grade group X on the basis of a difference value between an equivalent SINR before demodulation and a target SINR. The retransmission count grade X1 may be used to indicate a transmission count needed for correctly receiving a transmission block under a current channel condition, and in this sub-embodiment, for example, X1=2^4. The second node may feed the retransmission count grade X1 back to the first node. The retransmission count grade of the predetermined set A may be designed as an exponential sequence, and correspondingly, after a receiving end performs combined processing, data power may increase exponentially. When the receiving end receives data based on a certain retransmission count grade but cannot correctly receive the data to make it necessary to further receive retransmission data, the aim of halving or increasing retransmission power may be achieved by adjusting the repeat grade of the retransmission data. Thus, HARQ retransmission or reducing of resource waste may be realized more quickly.

In the present sub-embodiment, the second node may also determine the retransmission count grade X1 based on a target BLER. That is, after the transmission count of the transmission block or the retransmission count reaches the retransmission count corresponding to the retransmission count grade X1, the BLER of the transmission block may reach the target BLER. The second node may also set the retransmission count corresponding to the retransmission count grade X1 as a target average transmission count needed for the first node to correctly receive a transmission block under the current channel condition, so that the received BLER may fall within an appropriate range.

Sub-Embodiment 1.2

The predetermined set A may consist of arithmetic sequences. In the present sub-embodiment, for example, A={10, 15, 20, . . . , 115, 120}. Three adjacent elements in the predetermined set A may be grouped. For example, {10, 15, 20}, {15, 20, 25}, . . . , {110, 115, 120}, . . . each may be taken as a group respectively. The first node may configure, for example, a retransmission count grade a=20 through RRC signaling. The second node may select a grade group X (equivalent to the one or more transmission parameter grades X in the above-mentioned embodiment), so that the retransmission count grade a belongs to this group, and is smaller than a part of retransmission count grades in the grade group X and larger than remaining part or parts of retransmission count grades in the grade group. In this sub-embodiment, for example, X={15, 20, 25}. The second node may select a retransmission count grade X1 (equivalent to the transmission parameter grade X1 in the above-mentioned embodiment) from the grade group X on the basis of a difference value between an equivalent SINR before demodulation and a target SINR. The retransmission count grade X1 may be used to indicate a transmission count needed for correctly receiving a transmission block under a current channel condition, and in this sub-embodiment, for example, X1=15. The second node may feed X1 back to the first node. The grade group X may be selected by means of the retransmission count grade a configured by signaling. The second node may select the retransmission count grade X1 from the grade group X and feed back the selected retransmission count grade X1, and the first node and the second node may control selection of X1 simultaneously. The requirement for scheduling and the requirement for matching with channel conditions may be both considered. Meanwhile, the retransmission count grade of the predetermined set A may be designed as an arithmetic sequence, and correspondingly, after a receiving end performs combined processing, data power may increase in an arithmetic manner. When the receiving end receives data based on a certain retransmission count grade but cannot correctly receive the data to make it necessary to further receive retransmission data, the aim of reducing or increasing retransmission power may be achieved by adjusting the repeat grade of the retransmission data. Thus, HARQ retransmission or reducing of resource waste may be realized more quickly.

Sub-Embodiment 1.3

On the basis of the implementation manner of Sub-embodiment 1.1, the predetermined set A may also consist of geometric sequences. In the present sub-embodiment, for example, A={10, 20, . . . , 160, 320}. The process concerning how to select the grade group X from the predetermined set A and select the retransmission count grade X1 from the selected grade group X is similar to the process in Sub-embodiment 1.1, and will not be elaborated herein. The retransmission count grade of the predetermined set A may be designed as a geometric sequence, and correspondingly, after a receiving end performs combined processing, data power may increase exponentially. When the receiving end receives data based on a certain retransmission count grade but cannot correctly receive the data to make it necessary to further receive retransmission data, the aim of reducing or increasing retransmission power may be achieved by adjusting the repeat grade of the retransmission data. Thus, HARQ retransmission or reducing of resource waste may be realized more quickly.

Sub-Embodiment 1.4

On the basis of the implementation manner of Sub-embodiment 1.1, the predetermined set A may also be formed by combining elements of a sequence S1 and a sequence S2. In the present sub-embodiment, S1 may be a geometric sequence, and for example, S1={10, 20, 40, 80,160, 320}; and S2 may be an arithmetic sequence, and for example, S2={15, 35, 55, . . . , 295, 315}. In the present sub-embodiment, for example, A={10, 15, 20, 35, 40, 55, 75, 80, . . . , 295, 315, 320}. The process concerning how to select the grade group X from the predetermined set A and select the retransmission count grade X1 from the selected grade group X is similar to the process in Sub-embodiment 1.1, and will not be elaborated herein. It should be noted that S1 and S2 may be sequences of other types respectively. The retransmission count grade of the predetermined set A may be designed as an element combination of different sequences, and may provide different repeat count granularities.

Sub-Embodiment 1.5

On the basis of the implementation manner of Sub-embodiment 1.1, the predetermined set A may also have such characteristic: a subset R may exist in a predetermined set. R may be formed by one of a geometric sequence, an arithmetic sequence, an exponential sequence and an irregular sequence. Other elements may be inserted into the middle and/or two sides of the element(s) of R to form the predetermined set A. The element(s) of R and adjacent element(s)

of the element(s) of R may form at least one local sequence, the local sequence being one of a geometric sequence, an arithmetic sequence, an exponential sequence and an irregular sequence. In the present sub-embodiment, R may be a geometric sequence, and for example, R={8, 16, 32, ... , 128, 256}; and other elements may be inserted into the middle and/or two sides of the element(s) of R to form the predetermined set A. In the present sub-embodiment, for example, A={4, 8, 12, 16, 20, 24, 32, 40, 64, 102, 128, 161, 256}. In the predetermined set A, for example, {4, 8, 12}, {12, 16, 20} and {24, 32, 40} are arithmetic sequences, and both {40, 64, 102} and {102, 128, 161}, for example, are geometric sequences. The process concerning how to select the grade group X from the predetermined set A and select the retransmission count grade X1 from the selected grade group X is similar to the process in Sub-embodiment 1.1, and will not be elaborated herein. The retransmission count grade of the predetermined set A may be designed as an element combination of different sequences, and may provide different repeat count granularities.

Embodiment 2

When the one or more retransmission count grades X (equivalent to the one or more transmission parameter grades X in the above-mentioned embodiment) form a set, the act that a second node determines a retransmission count grade X1 based on a predetermined set A and at least one of predetermined information and indication signaling may be implemented in the following manner. A specific grade group (equivalent to the specified grade group in the above-mentioned embodiment) may be selected as one or more retransmission count grades X based on a retransmission count grade a (equivalent to the transmission parameter grade a in the above-mentioned embodiment), and a retransmission count grade X1 may be selected from the one or more retransmission count grades X. The retransmission count grade a may belong to the predetermined set A. The present embodiment elaborates determination manners of the retransmission count grade a. The embodiment includes the following sub-embodiments. Hereinafter, the predetermined set A being an arithmetic sequence is taken as an example, and the situation that the predetermined set A is other sequences is similar to this situation, and will not be elaborated herein.

In Sub-embodiment 2.1-2.5, the following scenario is taken as an example: a predetermined set A={10, 15, 20, ... , 115, 120}, three adjacent elements in the predetermined set A may be grouped, for example, {10, 15, 20}, {15, 20, 25}, ... , {110, 115, 120}, ... each may be taken as a group respectively, and a retransmission count grade is taken as a transmission parameter grade. A grade group X in the following embodiment is equivalent to the one or more transmission parameter grades X in the above-mentioned embodiment.

Sub-Embodiment 2.1

Under the condition that the retransmission count grade a is configured by the first node through RRC signaling, the process of determining, by the second node, the retransmission count grade X1 is as described in Sub-embodiment 1.2 in detail, and will not be elaborated herein.

Sub-Embodiment 2.2

The retransmission count grade a may also be indicated by the first node through DCI. In the present sub-embodiment, the second node may receive DCI sent by the first node, the DCI indicating that the retransmission count grade a is equal to e.g., 30. The second node may select a grade group X, so that the retransmission count grade a belongs to this group, and is smaller than a part of transmission parameter grades in the grade group and larger than remaining part or parts of transmission parameter grades in the grade group. In this sub-embodiment, for example, X={25, 30, 35}. The grade group X may be selected by means of the retransmission count grade a configured by signaling. The second node may select a retransmission count grade X1 from the grade group X and feed back the selected retransmission count grade X1. The first node and the second node may control selection of the retransmission count grade X1 simultaneously. The requirement for scheduling and the requirement for matching with channel conditions may be both considered.

Sub-Embodiment 2.3

The retransmission count grade a may be obtained based on a retransmission count of a corresponding transmission block in first or previous HARQ transmission, or the retransmission count grade a may be obtained based on the sum of all retransmission counts of the corresponding transmission block that has been transmitted. In the present sub-embodiment, a specific transmission block has completed two HARQ transmissions, but cannot be correctly decoded. Retransmission counts corresponding to two HARQ transmissions are e.g., 20 and 15. On the basis of the predetermined set A and the grade group X selection manner in Sub-embodiment 2.1, if the second node obtains the retransmission count grade a based on the retransmission count of the corresponding transmission block in the first HARQ transmission, then a=20, and X={15, 20, 25}. If the second node obtains the retransmission count grade a based on the retransmission count of the corresponding transmission block in the previous HARQ transmission, then a=15, and X={10, 15, 20}. If the second node obtains the retransmission count grade a based on the sum of all the retransmission counts of the corresponding transmission block that has been transmitted, then a=20+15=35, and X={30, 35, 40}. The second transmission node may select the grade group X and may feed the grade group X back for indicating a retransmission count of the transmission block in third HARQ transmission. The advantages of obtaining the retransmission count grade a based on the retransmission count of the corresponding transmission block in the first or previous HARQ transmission or obtaining the retransmission count grade a based on the sum of all the retransmission counts of the corresponding transmission block that has been transmitted are described as follows. By obtaining the retransmission count grade a before determining the one or more retransmission count grades X, the one or more retransmission count grades X may be changed along with the previous actual retransmission count, thereby better matching with channel conditions.

Sub-Embodiment 2.4

The retransmission count grade a may be obtained based on a total retransmission count of a transmission block that has been correctly received, or a retransmission count in first HARQ transmission. In the present sub-embodiment, the second node may need to feed a retransmission count grade X1 back to assist the first node in determination of a retransmission count of a specific transmission block.

Before the specific transmission block, another transmission block B may have been correctly received. The transmission block B may be correctly received after two HARQ transmissions. The total retransmission count may be, for example, 45, and the retransmission count in the first HARQ transmission may be, for example, 30. On the basis of the predetermined set A and the grade group X selection manner in Sub-embodiment 2.1, if the second node obtains the retransmission count grade a based on the retransmission count of the transmission block B in the first HARQ transmission, then a=30, and X={25, 30, 35}; and if the second node obtains the retransmission count grade a based on the total retransmission count of the transmission block B, then a=45, and X={40, 45, 50}. The second transmission node may select a retransmission count grade X1 and may feed the retransmission count grade X1 back for indicating the retransmission count of the specific transmission block. The advantages of obtaining the retransmission count grade a based on the total retransmission count of the transmission block that has been correctly received or the retransmission count in the first HARQ transmission are described as follows. By obtaining the retransmission count grade a before determining the one or more retransmission count grades X, the one or more retransmission count grades X may be changed along with the previous actual retransmission count, thereby better matching with channel conditions. Specifically when a new transmission block is sent, a repeat count of the new transmission block may be obtained with reference to the previous transmission block.

Sub-Embodiment 2.5

The retransmission count grade a may be obtained based on a retransmission count of previous feedback. In the present sub-embodiment, the second node may need to feed a retransmission count grade X1 back to assist the first node in determination of a retransmission count of a specific transmission block. Before the specific transmission block, another transmission block B may have been correctly received. The transmission block B may be correctly received after two HARQ transmissions. The total retransmission count is e.g., 45, and a retransmission count in first HARQ transmission is e.g., 30. Retransmission counts fed back by the second node for two HARQ transmissions of B are e.g., 40 and 15. On the basis of the predetermined set A and a selection manner for a grade group X (equivalent to the one or more retransmission count grades X in the above-mentioned embodiment, also equivalent to the one or more transmission parameter grades X in the above-mentioned embodiment) in Sub-embodiment 2.1, if the second node obtains the retransmission count grade a based on the retransmission count of the feedback corresponding to the transmission block B in the first HARQ transmission, then a=40, and X={35, 40, 45}; and if the second node obtains the retransmission count grade a based on the total retransmission count of two feedbacks corresponding to the transmission block B, then a=40+15=55, and X={50, 55, 60}. The second transmission node may select a retransmission count grade X1 and may feed the retransmission count grade X1 back for indicating the retransmission count of the specific transmission block. It should be noted that the retransmission count grade a may be obtained based on the retransmission count grade of the previous feedback under the following condition. A retransmission count grade X1 corresponding to a specific transmission block in N+1$^{th}$ HARQ transmission may be obtained based on the retransmission count of the feedback corresponding to the previous HARQ transmission of the transmission block. The advantages of obtaining the retransmission count grade a based on the retransmission count grade of the previous feedback are described as follows. By virtue of obtaining the retransmission count grade a before determining the one or more retransmission count grades X, the one or more retransmission count grades X may be changed along with the previous predicted channel condition, thereby better matching with channel conditions.

Embodiment 3

A specific grade group may be selected as one or more retransmission count grades X (equivalent to the one or more transmission parameter grades X in the above-mentioned embodiment) based on a retransmission count grade a (equivalent to the retransmission count grade a in the above-mentioned embodiment). The specific grade group may be selected from a specific grade group set. The specific grade group set may be determined based on at least one of the following manners: grouping manner 1, grouping manner 2 and grouping manner 3. The present embodiment illustrates determination manners of the specific grade group set, and includes the following sub-embodiments.

Sub-Embodiment 3.1

The specific sub-embodiment may refer to Sub-embodiment 1.1 or 2.1. In this sub-embodiment, adjacent elements in a predetermined set A may be grouped (grouping manner 1), which is a simpler processing manner.

Sub-Embodiment 3.2

The predetermined set A may consist of arithmetic sequences. In the present sub-embodiment, for example, A={10, 15, 20, ..., 115, 120}. A determination manner of a grade group set is combination of a grouping manner 1 and a grouping manner 2. In the sub-embodiment, for example, {10, 15, 20}, {10, 20, 30}, {15, 25, 35}, {20, 30, 40}, ..., {95, 105, 115}, {100, 110, 120} and {110, 115, 120} may be determined as grade groups. Elements in {10, 15, 20} and {110, 115, 120} may be successive adjacent elements in the predetermined set A (grouping manner 1), and elements in other grade group sets may be elements in the predetermined set A at equal intervals (grouping manner 2). The first node may configure a retransmission count grade a through RRC signaling. When 15≤a≤115, the second node may select a grade group X (equivalent to the one or more retransmission count grades X in the above-mentioned embodiment, also equivalent to the one or more transmission parameter grades X in the above-mentioned embodiment), so that the retransmission count grade a belongs to this group, and is smaller than a part of retransmission count grades in the grade group X and larger than remaining part or parts of retransmission count grades in the grade group. When a=10, the second node may select, for example, the grade group {10, 15, 20}; and when a=120, the second node may select, for example, the grade group {110, 115, 120}. The second node may select a retransmission count grade X1 from the grade group X on the basis of a difference value between an equivalent SINR before demodulation and a target SINR. The retransmission count grade X1 may be used to indicate a transmission count needed for correctly receiving a transmission block under a current channel condition. The second node may feed the retransmission count grade X1 back to the first node.

First, the elements in the grade group set may be a plurality of elements extracted from the predetermined set A at equal intervals. A larger interval range may be provided for selection of X1, so that HARQ retransmission or saving of system resources may be quickly implemented. Second, the advantages that the second node selects the grade group X (equivalent to the one or more retransmission count grades X in the above-mentioned embodiment, also equivalent to the one or more transmission parameter grades X in the above-mentioned embodiment) so that the retransmission count grade a belongs to this group and is smaller than a part of retransmission count grades in the grade group X and larger than remaining part or parts of retransmission count grades in the grade group are described as follows. The second node has a right of selecting a repeat count larger than the retransmission count grade a and a repeat count smaller than the retransmission count grade a, so that requirements for reducing the system resource overheads and reducing the time delay may be both considered. Third, in consideration of limitation of an element interval range, a grouping manner of elements at two sides of an element interval of the predetermined set A may be different from a grouping manner of middle elements. In addition, when the retransmission count grade a is equal to 10, the second node may select the grade group X, so that the retransmission count grade a belongs to this group, and is smaller than other grades in the grade group. That is because 10 may have been the minimum retransmission count grade and it is unnecessary to use a smaller grade. When a=120, the second node may select the grade group X, so that the retransmission count grade a belongs to this group, and is larger than other grades in the grade group. That is because 120 has been the maximum repeat grade.

Sub-Embodiment 3.3

The predetermined set A may consist of arithmetic sequences. In the present sub-embodiment, for example, A={10, 15, 20, . . . , 115, 120}. A determination manner of a grade group set may be combination of a grouping manner 1, a grouping manner 2 and a grouping manner 3. For example, {10, 15, 20}, {10, 15, 25}, {10, 20, 30}, {15, 25, 35}, {20, 30, 40}, . . . , {95, 105, 115}, {100, 110, 120}, {105, 115, 120} and {110, 115, 120} may be determined as grade groups. Elements in {10, 15, 20} and {110, 115, 120} are successive adjacent elements in the predetermined set A (grouping manner 1), elements in {10, 15, 25} and {105, 115, 120} are combination of elements extracted successively and elements extracted at intervals in the predetermined set A (grouping manner 3), and elements in other grade group sets are elements in the predetermined set A at equal intervals (grouping manner 2). The first node may configure a retransmission count grade a through RRC signaling. When 20≤a≤110, the second node may select a grade group X (equivalent to the one or more retransmission count grades X in the above-mentioned embodiment, also equivalent to the one or more transmission parameter grades X in the above-mentioned embodiment), so that the retransmission count grade a belongs to this group, and is smaller than a part of retransmission count grades in the grade group X and larger than remaining part or parts of retransmission count grades in the grade group. When a=15, the second node may select, for example, {10, 15, 25}; when a=10, the second node may select, for example, {10, 15, 20}; when a=115, the second node may select, for example, the grade group {105, 115, 120}; and when a=120, the second node may select, for example, the grade group {110, 115, 120}.

The second node may select a retransmission count grade X1 from the grade group X on the basis of a difference value between an equivalent SINR before demodulation and a target SINR. The retransmission count grade X1 may be used to indicate a transmission count needed for correctly receiving a transmission block under a current channel condition. The second node may feed the retransmission count grade X1 back to the first node. The elements in the grade group set may be a plurality of elements extracted from the predetermined set A at equal intervals. A larger interval range may be being provided for selection of X1, so that HARQ retransmission or saving of system resources may be quickly implemented. In consideration of limitation of an element interval to two sides of these elements, a grouping manner of elements at two sides of an element interval of the predetermined set A may be different from a grouping manner of middle elements.

Sub-Embodiment 3.4

The predetermined set A may consist of arithmetic sequences. In the present sub-embodiment, for example, A={10, 15, 20, . . . , 115, 120}. A determination manner of a grade group set may be a grouping manner 2. In the present sub-embodiment, for example, {10, 20, 30}, {15, 25, 35}, {20, 30, 40}, . . . , {95, 105, 115} and {100, 110, 120} may be determined as grade groups. The first node may configure a retransmission count grade a through RRC signaling. When 20≤a≤110, the second node may select a grade group X (equivalent to the one or more retransmission count grades X in the above-mentioned embodiment, also equivalent to the one or more transmission parameter grades X in the above-mentioned embodiment), so that the retransmission count grade a belongs to this group, and is smaller than a part of retransmission count grades in the grade group X and larger than remaining part or parts of retransmission count grades in the grade group. When a=10/15, the second node may select the grade group X, so that the retransmission count grade a belongs to this group, and is smaller than other grades in the grade group, for example, the second node may select the grade groups {10, 20, 30} and {15, 25, 35} respectively. When a=115/120, the second node may select the grade group X, so that the retransmission count grade a belongs to this group, and is larger than other grades in the grade group, for example, the second node may select the grade groups {95, 105, 115} and {100, 110, 120} respectively. The second node may select a retransmission count grade X1 from the grade group X on the basis of a difference value between an equivalent SINR before demodulation and a target SINR. The retransmission count grade X1 may be used to indicate a transmission count needed for correctly receiving a transmission block under a current channel condition. The second node may feed the retransmission count grade X1 back to the first node. The elements in the grade group set may be a plurality of elements extracted from the predetermined set A at equal intervals. A larger interval range may be provided for selection of X1, so that HARQ retransmission or saving of system resources may be quickly implemented. When the retransmission count grade a is equal to one of elements at two sides of an element interval of the predetermined set A, the grade group selection manner under this situation may be different from the situation that the retransmission count grade a is equal to a middle element of the predetermined set A, and may be related to a grouping manner.

In Embodiment 3, when the retransmission count grade a belongs to N3=1 minimum elements in the predetermined set A, the second node may select the grade group X, so that the retransmission count grade a belongs to this group, and is smaller than other grades in the grade group. When the retransmission count grade a belongs to N4=1 maximum elements in the predetermined set A, the second node may select the grade group X, so that the retransmission count grade a belongs to this group, and is larger than other grades in the grade group; and otherwise, the second node may select the grade group X, so that the retransmission count grade a belongs to this group, and is smaller than a part of transmission parameter grades in the grade group and larger than remaining part or parts of transmission parameter grades in the grade group. It should be noted that N3 and N4 may not always be equal to 1, and may be other positive integers. The advantages that the second node selects the grade group X so that the retransmission count grade a belongs to this group and is smaller than a part of transmission parameter grades in the grade group and larger than remaining part or parts of transmission parameter grades in the grade group are described as follows. The second node may have an opportunity of selecting a repeat count larger than the retransmission count grade a or a repeat count smaller than the retransmission count grade a, and requirements for reducing the system resource overheads and reducing the time delay may be both considered. When the retransmission count grade a is equal to N3 minimum elements in the predetermined set A, the second node may select the grade group X, so that the retransmission count grade a belongs to this group, and is smaller than other grades in the grade group. That is because the retransmission count grade a has been a small retransmission count grade and it is unnecessary to use a smaller grade to refine a retransmission count. A principal contradiction in this situation is a large transmission time delay, and the transmission time delay may be reduced without remarkably reducing the spectrum efficiency by selecting a larger transmission parameter grade. When the retransmission count grade a belongs to N4 maximum elements in the predetermined set A, the second node may select the grade group X, so that the retransmission count grade a belongs to this group, and is larger than other grades in the grade group. That is because the retransmission count grade a has been the maximum repeat grade and it is unnecessary to select a larger grade to reduce an HARQ transmission count and the time delay. A principal contradiction in this situation is low spectrum efficiency caused by over-large total retransmission count during correct receiving, and the spectrum efficiency may be improved without remarkably increasing the transmission time delay by selecting a smaller transmission parameter grade.

Embodiment 4

The present embodiment may select a grade group selection manner 1/2/3 based on a specific service requirement or transmission block size or code rate or HARQ transmission count, and includes the following sub-embodiments.

Sub-Embodiment 4.1

The predetermined set A may consist of arithmetic sequences. In the present sub-embodiment, for example, A={10, 15, 20, . . . , 115, 120}. A determination manner of a grade group set may be a grouping manner 1. In this sub-embodiment, for example, {10, 15, 20}, {15, 20, 25}, . . . , {105, 110, 115} and {110, 115, 120} may be determined as grade groups. The first node may configure a retransmission count grade a through RRC signaling. When 15≤a≤115, the second node may select a grade group X, so that the retransmission count grade a belongs to this group, and is smaller than some repeat parameter grades in the grade group and larger than some other repeat parameter grades in the grade group. For example, when a=15, the second node may select the grade group {10, 15, 20}; and when a=115, the second node may select {110, 115, 120}. In addition, when a=10, the second node may select the grade group {10, 15, 20}; and when a=120, the second node may select {110, 115, 120}. The second node may select a retransmission count grade X1 from the grade group X on the basis of a difference value between an equivalent SINR before demodulation and a target SINR. The retransmission count grade X1 may be used to indicate a transmission count needed for correctly receiving a transmission block under a current channel condition. The second node may feed the retransmission count grade X1 back to the first node. By means of the grade group selection manner 3, the second node may have an opportunity of selecting a repeat count larger than the retransmission count grade a or a repeat count smaller than the retransmission count grade a, and requirements for reducing the system resource overheads and reducing the time delay may be both considered.

Sub-Embodiment 4.2

The predetermined set A may consist of arithmetic sequences. In the present sub-embodiment, for example, A={10, 15, 20, . . . , 115, 120}. A determination manner of a grade group set may be a grouping manner 1. In the present sub-embodiment, for example, {10, 15, 20}, {15, 20, 25}, . . . , {105, 110, 115} and {110, 115, 120} may be determined as grade groups. The first node may configure a retransmission count grade a through RRC signaling. It may be pre-defined that when a=10, the second node may select the grade group {10, 15, 20}; when a=120, the second node may select {110, 115, 120}; and when 15≤a≤115, the second node adopts a grade group selection manner 3, namely may select a grade group X by default, so that the retransmission count grade a belongs to this group, and is smaller than a part of retransmission count grades in the grade group and larger than remaining part or parts of retransmission count grades in the grade group. When there is a requirement for high spectrum efficiency and when 20≤a≤120, the second node may adopt a grade group selection manner 2, namely may select a grade group X, so that the retransmission count grade a belongs to this group, and is larger than other grades in the grade group. When there is a requirement for high spectrum efficiency and when 10≤a≤15, the second node may adopt a grade group selection manner 2, namely may select, for example, the grade group {10, 15, 20}. When there is a requirement for low time delay and when 10≤a≤110, the second node may adopt a grade group selection manner 1, namely may select a grade group X, so that the retransmission count grade a belongs to this group, and is smaller than other retransmission count grades in the grade group. When there is a requirement for low time delay and when a=115/120, the second node may adopt a grade group selection manner 2, namely may select, for example, the grade group {110, 115, 120}. The second node may select a retransmission count grade X1 from the grade group X on the basis of a difference value between an equivalent SINR before demodulation and a target SINR. The retransmission count grade X1 may be used to indicate a transmission count needed for correctly receiving a transmission block under a current channel condition. The second node may feed the retransmission count grade X1 back to the first node. By means of the grade group selection manner 1, the second node may select a retransmission count larger than the retransmission count grade a or equal to the retransmission count grade a, thereby facilitating reduction of an HARQ transmission count and reduction of the transmission time delay. By means of the grade group selection manner 2, the second node may select a retransmission count smaller than the retransmission count grade a or equal to the retransmission count grade a, so the retransmission count may be refined, and system resources may be saved. By means of the grade group selection manner 3, requirements for saving system resources and reducing the transmission time delay may be both considered, and meanwhile, the second node may have an opportunity of selecting a retransmission count smaller than the retransmission count grade a and a repeat count larger than the retransmission count grade a.

Sub-Embodiment 4.3

When a transmission block size is larger than a specific threshold value, the grade group selection manner 2 may be selected. When the transmission block size is smaller than the specific threshold value, the grade group selection manner 1 may be selected. When a code rate is larger than the specific threshold value, the grade group selection manner 1 may be selected. When an HARQ transmission count is larger than the specific threshold value, the grade group selection manner 1 may be selected. The advantages of selecting a grade group based on the transmission block size, the code rate or the HARQ transmission count are described as follows. The retransmission count grade group X may be limited so as to limit a retransmission count grade X1 fed back by the second node. When the transmission block size is large, selection of the grade group selection manner 2 may save resources. When the code rate is large, selection of the grade group selection manner 1 may implement correct HARQ transmission more quickly. When the HARQ transmission count is larger than the specific threshold value, selection of the grade group selection manner 1 may also implement correct HARQ transmission more quickly.

Sub-Embodiment 4.4

When the code rate is larger than the specific threshold value, a grouping manner 2 may be selected. When the HARQ transmission count is larger than the specific threshold value, the grouping manner 2 may be selected. The advantages of selecting a grade group based on the code rate and the HARQ transmission count are described as follows. A retransmission count grade group X may be limited so as to limit a retransmission count grade X1 fed back by the second node. Selection of the grouping manner 2 may make elements of the retransmission count grade group X within a larger interval range, so a wider selection range may be provided for the second node, and HARQ transmission or resource saving may be better implemented.

Embodiment 5

In the foregoing embodiments, elements in the predetermined set A may be grouped to obtain the specified grade group set. The elements in the predetermined set A may be transmission parameters. A specified grade group may be selected from the specified grade group set based on a transmission parameter grade a. A receiving end may select a grade from the specified grade group based on a preset rule and may feed the selected grade back to a sending end. In Embodiment 5, the specified grade group set may not be obtained based on the predetermined set A but may be pre-defined. Certainly, the specified grade group set may also be configured by indication signaling.

A grade group set may be pre-defined. The set may include three grade groups, for example, (0.25, 0.5, 1), (0.5, 1, 2) and (1, 2, 4). Related operations such as multiplication operation may be performed on elements in the grade groups and a transmission parameter corresponding to the transmission parameter grade a to obtain candidate transmission parameters to be fed back. In one HARQ transmission, the sending end may repeatedly send a transmission block for 10 times, and the receiving end may fail in correctly decoding the transmission block after performing combination processing. In this embodiment, a retransmission count corresponding to the transmission parameter grade a may be 10. The receiving end may feed NACK information back. The NACK information may be used for indicating a transmission count in the next HARQ transmission of the sending end. In correspondence to the three grade groups, alternative transmission counts to be fed back may be, for example, (ceil(0.25*10), 0.5*10, 1*10)=(3, 5, 10), or (0.5*10, 1*10, 2*10)=(5, 10, 20), or (1*10, 2*10, 4*10)=(10, 20, 40).

It may be pre-defined that the receiving end uses (0.5, 1, 2) to obtain a transmission parameter grade set for feedback. When a specified service requires high spectrum efficiency and saving of time-frequency resources, the receiving end may adopt, for example, (0.25, 0.5, 1) to obtain a transmission parameter grade set for feedback. When a specified service requires low time delay, the receiving end may adopt, for example, (0.5, 1, 2) or (1, 2, 4) to obtain a transmission parameter grade set for feedback.

In Embodiment 5, for example, a=10. If a=2, the receiving end may adopt, for example, (1, 2, 4) to obtain a transmission parameter grade set for feedback, which is mainly required to limit feedback granularity. When the transmission parameter grade a is small, high feedback time delay is a principal contradiction, and a high grade in the transmission parameter grade set may correspond to a lower transmission time delay. If the sending end performs transmission based on the transmission parameter fed back by a terminal, the transmission time delay may be reduced without remarkably reducing the spectrum efficiency. Otherwise, if a=100, the receiving end may adopt, for example, (0.25, 0.5, 1) to obtain a transmission parameter grade set for feedback, which is mainly required to reduce a repeat count. When the transmission parameter grade a is large, low spectrum efficiency is a principal contradiction, and a low grade in the transmission parameter grade set may correspond to higher spectrum efficiency. If the sending end performs transmission based on the transmission parameter fed back by the terminal, the spectrum efficiency may be increased without remarkably reducing the transmission time delay. If the transmission parameter grade a is moderate in size, the receiving end may adopt, for example, (0.5, 1, 2) to obtain a transmission parameter grade set for feedback. Meanwhile, reduction of the time delay and increase of the spectrum efficiency may both be taken into consideration.

To sum up, by means of the method for determining link information provided in some embodiments of the disclosure, link-related information may be determined with a small feedback overhead or without feedback overheads, a sending end may be assisted in sending-side processing such as adaptive coding and modulation, thereby better implementing HARQ transmission. Thus, a relationship between utilization of system time-frequency resources and the transmission time delay may be balanced. The solution of some embodiments of the disclosure may be combined with a soft HARQ technology, so a problem of link adaptation under the condition that the existing CSI feedback solution cannot be used may be solved. To sum up, link adaptation may be better implemented, the system performance may be optimized, and service requirements may be met.

In another embodiment, software is also provided. The software is used for executing the technical solution described in the above-mentioned embodiments and preferable implementation manners.

In another embodiment, a storage medium is also provided. The above-mentioned software is stored in the storage medium. The storage medium includes, but is not limited to, an optical disk, a floppy disk, a hard disk, an erasable memory and the like.

Obviously, a person skilled in the art shall understand that all of the abovementioned modules or acts in the disclosure may be implemented by using a general calculation apparatus, may be centralized on a single calculation apparatus or may be distributed on a network composed of a plurality of calculation apparatuses. Alternatively, they may be implemented by using executable program codes of the calculation apparatuses. Thus, they may be stored in a storage apparatus and executed by the calculation apparatuses, the shown or described acts may be executed in a sequence different from this sequence under certain conditions, or they are manufactured into each integrated circuit module respectively, or multiple modules or acts therein are manufactured into a single integrated circuit module. Thus, the disclosure is not limited to a combination of any specific hardware and software.

The above is only the preferable embodiments of the disclosure, and not intended to limit the disclosure. As will occur to a person skilled in the art, the disclosure is susceptible to various modifications and changes. Any modifications, equivalent replacements, improvements and the like made within the spirit and principle of the disclosure shall fall within the scope of protection of the disclosure.

INDUSTRIAL APPLICABILITY

On the basis of the above-mentioned technical solution provided in the embodiment of the disclosure, a second node may determine a transmission parameter grade X1 based on a predetermined set and at least one of predetermined information and indication signaling. The transmission parameter grade X1 may be used for indicating a grade of a transmission parameter for HARQ transmission, the transmission parameter may include at least one of: a repeat count, a code rate, time-frequency resources occupied by data transmission, a modulation scheme and a transmission block size. The predetermined information may include one of: a transmission block size, a code rate, an HARQ transmission count, an HARQ transmission repeat count, a transmission parameter fed back by the second node, and a preset trigger condition. The predetermined set may be a set consisting of one or more transmission parameter grades. The indication signaling may include at least one of: RRC signaling and DCI. A problem in a related technology concerning how to determine link information may be solved, thus implementing determination of the link information.

What is claimed is:

1. A transmission parameter determination method, comprising:
   determining, by a second node, a transmission parameter grade X1 based on a predetermined set and at least one of predetermined information and indication signaling, wherein the transmission parameter grade X1 is used for indicating a grade of a transmission parameter for Hybrid Automatic Repeat Request (HARQ) transmission, and the transmission parameter comprises at least one of: a repeat count, a code rate, time-frequency resources occupied by data transmission, a modulation scheme and a transmission block size;
   the predetermined information comprises one of: a transmission block size, a code rate, an HARQ transmission count, an HARQ transmission repeat count, a transmission parameter fed back by the second node, and a preset trigger condition;
   the predetermined set is a set consisting of more transmission parameter grades; and
   the indication signaling comprises at least one of: Radio Resource Control (RRC) signaling and Downlink Control Information (DCI);
   wherein determining, by the second node, the transmission parameter grade X1 based on the predetermined set and at least one of the predetermined information and the indication signaling comprises: selecting, by the second node, one or more transmission parameter grades X from the predetermined set based on at least one of the predetermined information and the indication signaling; and determining, by the second node, the transmission parameter grade X1 from the one or more transmission parameter grades X, wherein the one or more transmission parameter grades X form a subset of the predetermined set;
   wherein selecting, by the second node, the one or more transmission parameter grades X from the predetermined set based on at least one of the predetermined information and the indication signaling comprises:
   selecting a specified grade group from a specified grade group set based on a determined transmission parameter grade a, and determining the one or more transmission parameter grades X based on the specified grade group,
   wherein the transmission parameter grade a is determined by means of at least one of the following manners:
   determination manner 1: the transmission parameter grade a is determined through at least one of RRC signaling and DCI;
   determination manner 2: the transmission parameter grade a is determined based on a transmission parameter for initial transmission or previous HARQ transmission of a corresponding transmission block, or the transmission parameter grade a is determined based on transmission parameters for all transmissions, which have been executed, of a corresponding transmission block;
   determination manner 3: the transmission parameter grade a is determined based on all corresponding transmission parameters of a transmission block which has been correctly received or based on a transmission parameter for initial HARQ transmission;
   determination manner 4: the transmission parameter grade a is determined based on a transmission parameter grade fed back by the second node; and
   determination manner 5: the transmission parameter grade a is pre-defined; and the specified grade group set is obtained by means of one of the following manners:
    determination manner A: the predetermined set is divided into multiple specified grade groups, forming the specified grade group set, based on one of the following manners:
        grouping manner 1: every N1 successive adjacent elements in the predetermined set form one specified grade group, N1 being a positive integer;
        grouping manner 2: N2 elements extracted from the predetermined set at equal intervals form one specified grade group, N2 being a positive integer; and
        grouping manner 3: M1 adjacent elements extracted from the predetermined set and M2 elements extracted from the predetermined set at intervals form one specified grade group, both M1 and M2 being positive integers; and
    determination manner B: the specified grade group set is obtained based on indication signaling configurations or based on pre-defined configurations.

2. The method as claimed in claim 1, wherein a set form of the predetermined set comprises at least one of the following set forms:
    set form 1: the predetermined set consists of exponential sequences;
    set form 2: the predetermined set consists of arithmetic sequences;
    set form 3: the predetermined set consists of geometric sequences;
    set form 4: the predetermined set consists of irregular sequences;
    set form 5: the predetermined set is formed by combining elements of a sequence S1 and a sequence S2, the sequence S1 and the sequence S2 being one or more of a geometric sequence, an arithmetic sequence, an exponential sequence and an irregular sequence respectively;
    set form 6: the predetermined set comprises a subset, wherein the subset consists of one or more of a geometric sequence, an arithmetic sequence, an exponential sequence and an irregular sequence, other elements are included between elements contained in the subset and/or at two sides of one or more elements contained in the subset, one or more elements contained in the subset and one or more adjacent elements form at least one local sequence, and the at least one local sequence is one or more of a geometric sequence, an arithmetic sequence, an exponential sequence and an irregular sequence.

3. The method as claimed in claim 1, wherein the second node determines the transmission parameter grade X1 from the one or more transmission parameter grades X based on at least one of:
    a difference value between a current Signal to Interference and Noise Ratio (SINR) and a target SINR, a specified target Block Error Ratio (BLER) working point, a target average transmission count needed for correctly receiving a transmission block under a current channel condition, and an HARQ transmission count.

4. The method as claimed in claim 3, wherein determining, by the second node, the transmission parameter grade X1 from the one or more transmission parameter grades X comprises one of:
    selecting, from the one or more transmission parameter grades X, the transmission parameter grade X1 which enables a difference value between the target SINR and a receiving SINR during correct receiving of a transmission block to be minimum;
    selecting, from the one or more transmission parameter grades X, the transmission parameter grade X1 which enables a receiving SINR during correct receiving of a transmission block to be a minimum SINR larger than the target SINR.

5. The method as claimed in claim 3, wherein the second node is a Machine Type Communication (MTC) device or a base station or a Device to Device (D2D) device.

6. The method as claimed in claim 1, wherein elements of the specified grade group directly indicate transmission parameters corresponding to transmission parameter grades, or transmission parameters are obtained by performing specified operation on the transmission parameters corresponding to the elements of the specified grade group and a transmission parameter corresponding to the transmission parameter grade a.

7. The method as claimed in claim 1, wherein the grouping manner 1 or the grouping manner 2 or the grouping manner 3 is determined based on at least one of:
    the RRC signaling, indication of the DCI, the transmission block size, the code rate, and the HARQ transmission count.

8. The method as claimed in claim 7, wherein determining the grouping manner 2 comprises:
    selecting the grouping manner 2 when the code rate is larger than a first predetermined threshold value; and
    selecting the grouping manner 2 when the HARQ transmission count is larger than a second predetermined threshold value.

9. The method as claimed in claim 1, wherein the specified grade group is selected from the specified grade group set based on the determined transmission parameter grade a by means of at least one of the following selection manners:
    selection manner 1: selecting a grade group, having the following features, from the specified grade group set as the specified grade group: the transmission parameter corresponding to the transmission parameter grade a is smaller than or equal to transmission parameters corresponding to transmission parameter grades in the grade group;
    selection manner 2: selecting a grade group, having the following features, from the specified grade group set as the specified grade group: the transmission parameter corresponding to the transmission parameter grade a is larger than or equal to transmission parameters corresponding to transmission parameter grades in the grade group; and
    selection manner 3: selecting a grade group, having the following features, from the specified grade group set as the specified grade group: the transmission parameter corresponding to the transmission parameter grade a is smaller than transmission parameters corresponding to a part of transmission parameter grades in the grade group and larger than transmission parameters corresponding to remaining part or parts of transmission parameter grades in the grade group.

10. The method as claimed in claim 9, wherein the selection manner 1 or the selection manner 2 or the selection manner 3 is determined based on at least one of:
    the transmission parameter grade a, the preset trigger condition, the RRC signaling, indication of the DCI, the transmission block size, the code rate, and the HARQ transmission count.

11. The method as claimed in claim 10, wherein determining the selection manner 1 or the selection manner 2 or the selection manner 3 comprises:
selecting the selection manner 1 when the transmission parameter corresponding to the transmission parameter grade a belongs to transmission parameters corresponding to N3 minimum elements in the predetermined set, or when the transmission parameter grade a is smaller than A1;
selecting the selection manner 2 when the transmission parameter corresponding to the transmission parameter grade a belongs to transmission parameters corresponding to N4 maximum elements in the predetermined set, or when the transmission parameter grade a is smaller than A2; and
selecting the selection manner 3 under other situations, where N3 and N4 are positive integers, and A1 and A2 are real numbers.

12. The method as claimed in claim 10, wherein when the preset trigger condition comprises a specified service requirement, the selection manner 1 or the selection manner 2 or the selection manner 3 is selected through one of the following manners:
if the transmission parameter corresponding to the transmission parameter grade a is larger than transmission parameters corresponding to N5 minimum elements in the predetermined set and smaller than transmission parameters corresponding to N6 maximum elements in the predetermined set or when the transmission parameter grade a is larger than A3 and smaller than A4, the manner of selecting the selection manner 1 or the selection manner 2 or the selection manner 3 comprises at least one of:
selecting the selection manner 3 based on a pre-defined manner;
selecting the selection manner 2 or the selection manner 3 when the specified service requirement is a requirement for high spectrum efficiency and saving of time-frequency resources;
selecting the selection manner 1 or the selection manner 3 when the specified service requirement is a requirement for low delay; and
selecting the selection manner 3 when the specified service requirement is a requirement for compromised spectrum efficiency and delay,
where N5 and N6 are positive integers, and A3 and A4 are real numbers.

13. The method as claimed in claim 10, wherein determining the selection manner 1 or the selection manner 2 or the selection manner 3 comprises:
selecting the selection manner 2 when the transmission block size is larger than a third predetermined threshold value; or,
selecting the selection manner 1 when the transmission block size is smaller than a fourth predetermined threshold value; or,
selecting the selection manner 1 when the code rate is larger than a fifth predetermined threshold value; or,
selecting the selection manner 1 when the HARQ transmission count is larger than a sixth predetermined threshold value.

14. The method as claimed in claim 2, wherein the second node is a Machine Type Communication (MTC) device or a base station or a Device to Device (D2D) device.

15. The method as claimed in claim 1, wherein the second node is a Machine Type Communication (MTC) device or a base station or a Device to Device (D2D) device.

16. A second node, the second node comprises a hardware processor arranged to execute the following determination module:
a determination module, configured to determine a transmission parameter grade X1 based on a predetermined set and at least one of predetermined information and indication signaling,
wherein the transmission parameter grade X1 is used for indicating a grade of a transmission parameter for Hybrid Automatic Repeat Request (HARQ) transmission, and the transmission parameter comprises at least one of: a repeat count, a code rate, time-frequency resources occupied by data transmission, a modulation scheme and a transmission block size;
the predetermined information comprises one of: a transmission block size, a code rate, an HARQ transmission count, an HARQ transmission repeat count, a transmission parameter fed back by the second node, and a preset trigger condition;
the predetermined set is a set consisting of more transmission parameter grades; and
the indication signaling comprises at least one of: Radio Resource Control (RRC) signaling and Downlink Control Information (DCI);
when the second node is a base station, the base station will generate the RRC or the DCI first, and then the base station will perform the determination of the transmission parameter grade X1;
wherein the determination module is further configured to: select one or more transmission parameter grades X from the predetermined set based on at least one of the predetermined information and the indication signaling; and determine the transmission parameter grade X1 from the one or more transmission parameter grades X, wherein the one or more transmission parameter grades X form a subset of the predetermined set;
wherein the determination module is configured to select one or more transmission parameter grades X from the predetermined set based on at least one of the predetermined information and the indication signaling according to the following means:
selecting a specified grade group from a specified grade group set based on a determined transmission parameter grade a, and determining the one or more transmission parameter grades X based on the specified grade group,
wherein the transmission parameter grade a is determined by means of at least one of the following manners:
determination manner 1: the transmission parameter grade a is determined through at least one of RRC signaling and DCI;
determination manner 2: the transmission parameter grade a is determined based on a transmission parameter for initial transmission or previous HARQ transmission of a corresponding transmission block, or the transmission parameter grade a is determined based on transmission parameters for all transmissions, which have been executed, of a corresponding transmission block;
determination manner 3: the transmission parameter grade a is determined based on all corresponding transmission parameters of a transmission block which has been correctly received or based on a transmission parameter for initial HARQ transmission;
determination manner 4: the transmission parameter grade a is determined based on a transmission parameter grade fed back by the second node; and determination manner 5: the transmission parameter grade a is pre-defined; and the specified grade group set is obtained by means of one of the following manners:

determination manner A: the predetermined set is divided into multiple specified grade groups, forming the specified grade group set, based on one of the following manners:

grouping manner 1: every N1 successive adjacent elements in the predetermined set form one specified grade group, N1 being a positive integer;

grouping manner 2: N2 elements extracted from the predetermined set at equal intervals form one specified grade group, N2 being a positive integer; and grouping manner 3: M1 adjacent elements extracted from the predetermined set and M2 elements extracted from the predetermined set at intervals form one specified grade group, both M1 and M2 being positive integers; and determination manner B: the specified grade group set is obtained based on indication signaling configurations or based on pre-defined configurations.

\* \* \* \* \*